United States Patent
Rollet et al.

(10) Patent No.: US 9,395,446 B2
(45) Date of Patent: Jul. 19, 2016

(54) ONBOARD AIRCRAFT LANDING SYSTEM, BASED ON A GNSS SYSTEM, WITH REDUNDANT AND DISSIMILAR ARCHITECTURE FOR HIGH INTEGRITY LEVEL

(71) Applicant: THALES, Neuilly-sur-Seine (FR)

(72) Inventors: Stephane Rollet, Chabeuil (FR); Jean-Pierre Arethens, Beaumont les Valence (FR)

(73) Assignee: Thales, Courbevoie (FR)

( * ) Notice: Subject to any disclaimer, the term of this patent is extended or adjusted under 35 U.S.C. 154(b) by 599 days.

(21) Appl. No.: 13/855,430

(22) Filed: Apr. 2, 2013

(65) Prior Publication Data
US 2015/0362598 A1  Dec. 17, 2015

(30) Foreign Application Priority Data

Apr. 6, 2012  (FR) .................................... 12 01028

(51) Int. Cl.
| G06F 19/00 | (2011.01) |
| G01S 19/39 | (2010.01) |
| G01S 19/15 | (2010.01) |
| G01S 19/20 | (2010.01) |
| G01C 21/16 | (2006.01) |
| G01C 21/20 | (2006.01) |
| G05D 1/04 | (2006.01) |

(52) U.S. Cl.
CPC ............. *G01S 19/39* (2013.01); *G01C 21/165* (2013.01); *G01C 21/20* (2013.01); *G01S 19/15* (2013.01); *G01S 19/20* (2013.01); *G05D 1/042* (2013.01)

(58) Field of Classification Search
CPC .................................... B64G 1/36; G01S 5/02

USPC ....................................... 701/17, 4, 13, 16, 18
See application file for complete search history.

(56) References Cited

U.S. PATENT DOCUMENTS

| 5,945,943 A | 8/1999 | Kalafus et al. |
| 8,260,478 B1 * | 9/2012 | Green et al. ..................... 701/13 |
| 2003/0130771 A1 * | 7/2003 | Crank .............................. 701/4 |

FOREIGN PATENT DOCUMENTS

WO            9602905 A1       2/1996

OTHER PUBLICATIONS

Pier Domenico Tromboni et al.; Experiences in Data Analysis of a GBAS Approach Test: IEEEAC Paper #1654. Version 3; Updated Dec. 29, 2006; Rome, Italy.

*Primary Examiner* — Luke Huynh
(74) *Attorney, Agent, or Firm* — Michael J. Donohue; Davis Wright Tremaine LLP

(57) ABSTRACT

Device for receiving radio-navigation signals, for aiding the piloting of an aircraft, comprising a first master GNSS module and a second slave GNSS module which are dissimilar, the first master GNSS module comprising a first means for processing radio-navigation signals and a first means for computing guidance data ($X_g$), the second slave GNSS module comprising a second means for processing radio-navigation signals and a second means for computing guidance data ($X_g$) on the basis of the measurements provided by the said second means for processing signals, each GNSS module furthermore comprising a comparison means for comparing between the outputs $X_{g1}, X_{g2}$ of the said first and second means for computing guidance data, suitable for executing the following integrity test:

$$|X_{g1}-X_{g2}|>K_g\cdot\sqrt{\text{Variance}(X_{g1}-X_{g2})}$$

and for inferring an integrity defect if the said integrity test is satisfied.

15 Claims, 9 Drawing Sheets

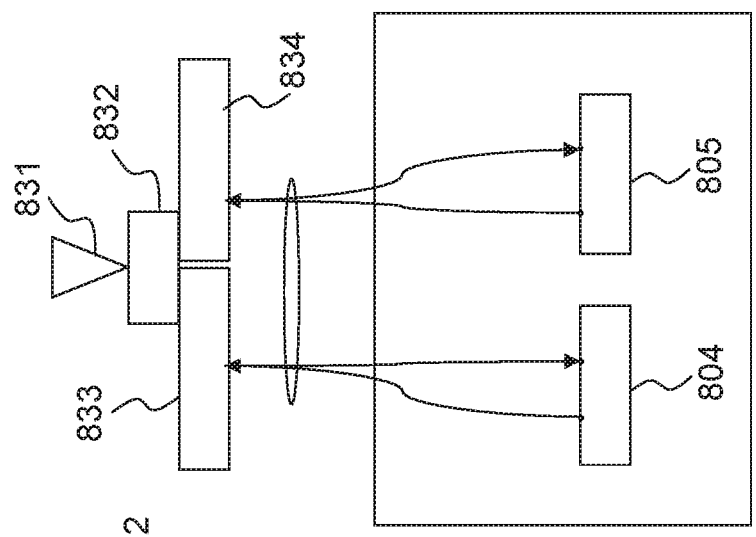
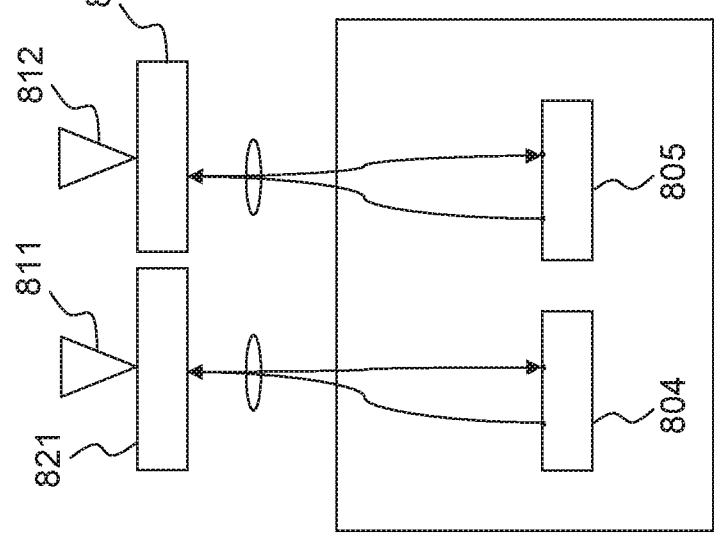
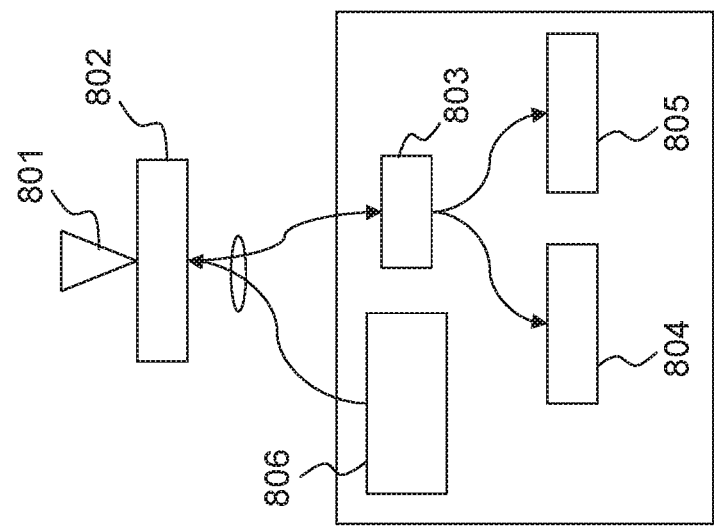

ONBOARD AIRCRAFT LANDING SYSTEM, BASED ON A GNSS SYSTEM, WITH REDUNDANT AND DISSIMILAR ARCHITECTURE FOR HIGH INTEGRITY LEVEL

FIELD OF THE INVENTION

The subject of the invention is an onboard aircraft landing system, of a type known by the acronym GLS (GNSS Landing System). In particular, it relates to aiding piloting in the approach phase, that is to say the phase which precedes the landing of the aircraft.

The field of the invention is that of piloting aid systems based on the use of GNSS systems.

BACKGROUND OF THE INVENTION

GLS provides angular deviations and metric guidance along an aircraft approach trajectory towards a runway of an airport of sufficient quality to allow automatic landing and rollout of the aeroplane in near-zero visibility conditions.

These guidance deviations are calculated from a three-dimensional positioning of the aircraft obtained by using a differential GNSS (Global Navigation Satellite System) system of GBAS (Ground Based Augmentation System) type. The positioning provided by the GBAS system is referred to the three-dimensional ideal trajectory that should be followed by the aeroplane in order to bring it to the runway.

Several categories of approach procedures are defined, as a function of the visibility level on landing. A so-called category I approach does not enable touchdown but enables to reach the landing zone up to a so-called decision height of 100 feet. A category I approach has safety requirements quantified by a risk of providing undetected erroneous outputs of less than $10^{-7}$ per hour.

Conversely, for a so-called category III approach, proceeding in proximity to the ground, and in visibility conditions which may be much reduced, the GLS system must guarantee a rate of undetected erroneous outputs of less than $10^{-9}$ per hour. Outputs is understood to mean all of the guidance deviation measurements provided by a GLS system for aiding navigation in the approach phase.

There therefore exists a need to design a GLS system with very high guaranteed integrity level so as to be compatible with the needs of a category III approach phase.

The known solutions for designing GLS systems are usually compatible only with the category I approach procedures, that is to say they do not make it possible to guarantee a sufficiently low rate of undetected output errors.

Two known types of architecture of GLS systems may be distinguished. A first type of architecture, based on a single-channel GNSS receiver, is represented in FIG. 10 1. It consists essentially of a GNSS receiver 101, for example of GPS or GPS/SBAS (Satellite Based Augmentation System) type linked on the one hand, by way of amplifying and filtering means 103, to an antenna 102 for receiving GPS or GPS/SBAS satellite-based radio-navigation signals, and on the other hand to a decoder 105 of VDB (VHF Data Broadcast) type which receives, by way of a VHF antenna 104, signals of 15 GBAS (Ground Based Augmentation System) type emitted by a ground station. The VDB decoder 105 transmits a set of corrections, also called augmentation data, to the GNSS receiver 101 which make it possible to improve the reliability of the GNSS signals moreover received via the antenna 102. The GNSS receiver 101 carries out, on the basis of the GNSS signals and of the GBAS corrections, on the one hand a navigation 20 function 111 and on the other hand an approach function 112 as well as a monitoring function 113. The navigation function 111 delivers as output a set of measurements 121 of Position, Velocity and Time allowing navigational aid. The approach function 112 delivers as output a set of similar measurements 122 or deviations allowing landing aid in the approach phase.

Finally, the monitoring function 113 is used to guarantee an integrity risk adapted to operations with limited criticality, for example operations of "Major" type for navigation or "Hazardous" type for approach. For operations of this type, the integrity risk related to a hardware fault of the receiver must be limited to $10^{-7}/h$ as explained hereinabove.

A single-channel solution of the type of that represented in FIG. 1 does not enable to meet the safety requirements of the operations whose integrity risk level is more constraining, for example operations classed "catastrophic" for which the integrity risk must be less than $10^{-9}/h$. Indeed, to attain such safety requirements, it is necessary that the probability that a simple fault gives rise to an integrity defect be negligible with respect to the integrity risk of $10^{-9}/h$. By taking a factor of 1000, the probability of occurrence of a simple fault impacting integrity ought to be less than $10^{-12}/h$, this not being attainable. The solutions based on the use of a single channel are not protected against a simple fault since they do not define any external monitoring means enabling to detect this fault. Category III approaches are classed "catastrophic" and may not therefore be implemented by this type of single-channel solution.

A second type of architecture, based on a dual-channel mechanism for GNSS modules is represented in FIG. 2. The elements identical to the architectures of FIGS. 1 and 2 are identified by the same references.

A second GNSS module 201, also called a second channel, is associated with the first GNSS receiver 101 so as to improve the overall integrity. Accordingly, a cross-comparison of the outputs of each approach function 112,212 is carried out via two comparators 211,213. A simple criterion enables to invalidate the measurements of guidance deviations which are too dissimilar between the two channels. Light monitoring 214,215 is implemented in each GNSS module 101,201 but enables to ensure a suitable integrity risk only for category I operations.

The second channel 201 constitutes a mechanism for external monitoring of the first channel 101, however this solution does not guarantee the independence of the two channels. Indeed, placing two channels in parallel without being certain of their dissimilarity protects only from integrity defects related to variability in manufacture and in reliability of the components but does not guarantee detection of integrity defects related to design errors revealed by one and the same external event. As examples of external events not detected by the solution of FIG. 2 the following may be cited:

Failure of electronic components, related to a specific environment in terms of vibration, acceleration or temperature: in GNSS receivers, the filters, oscillators, amplifiers are sensitive to these phenomena and may give rise to integrity defects, Failure of the power supply functions, related to disturbed operation of the primary supply stages powering the two receivers 101,201, Failure of the GNSS functions, related to a specific configuration unexpected by the receiver of the GNSS system, for example relating to the modulation of the signal, the Doppler perceived by the receiver, the specific geometry of the constellation or a particular instant of reception of the signals, Failure of the GNSS functions, related to a specific configuration unexpected by the receiver of the aeroplane Failure of the GNSS functions, related to a specific environment (dynamics, attitude, position, current time, etc.) unexpected by the receiver of interference and/or of multipaths, Failure of the approach functions, related to a specific configuration unexpected by the receiver of the ground station and corrections emitted (identification, authentication, approach segment (FAS), corrections emitted, etc.).

For all the examples given above, a single event may reveal one and the same design defect in the two channels 101,201, rendering the comparison functions completely inoperative, since the two channels may produce an integrity defect which is very similar and consequently undetectable by a single comparator.

This weakness is not acceptable for category III approach operations classed "Catastrophic" for two reasons. Firstly, a simple fault may give rise to an undetected error at the output of the dual channel. Moreover, the dependency of the two channels with common faults considerably limits the reachable improvement in the integrity risk and does not enable to reach the expected rate of undetected faults of $10^{-9}$/h.

This problem may be illustrated by the following equation, and by introducing the following variables:

HMI the integrity risk ensured, $HMI_c$ the integrity risk common to the two receivers, related to design defects, $HMI_{Rx1}$ the integrity risk specific to the first receiver 101, $HMI_{Rx2}$ the integrity risk specific to the second receiver 201, P the probability of non-detection of an integrity defect by comparing the results provided by the two receivers 101,201, We have:

$$HMI = HMI_c + P \cdot (HMI_{Rx1} + HMI_{Rx2} + HMI_{Rx1} \cdot HMI_{Rx2})$$

The above equation outlines the fact that the dual-channel principle enables to reduce only the integrity risks $HMI_{Rx1}$, $HMI_{Rx2}$ which are independent between the two receivers 101,201 by acting on the probability P. On the other hand the integrity risks which are common $HMI_c$ cannot be removed.

Thus, the existing solutions do not enable to limit the integrity risk to the safety level necessary for the category III approach operation.

SUMMARY OF THE INVENTION

The invention is aimed at designing a GLS system which enables to obtain the integrity level sufficient to guarantee the risk of providing an undetected erroneous item of information at the level which is required for category III approach operations.

The invention also enables to prevent a simple fault from generating an undetected erroneous item of information.

The subject of the invention is thus a device for receiving radio-navigation signals, for aiding the piloting of an aircraft, characterized in that it comprises a first master GNSS module and a second slave GNSS module which are dissimilar, the first master GNSS module comprising a first means for processing radio-navigation signals and a first means for computing guidance data on the basis of the measurements provided by the said first means for processing signals, the second slave GNSS module comprising a second means for processing radio-navigation signals and a second means for computing guidance data on the basis of the measurements provided by the said second means for processing signals, each GNSS module furthermore comprising a comparison means for comparing between the outputs $X_{g1}, X_{g2}$ of the said first and second means for computing guidance data, suitable for executing the following integrity test:

$$|X_{g1} - X_{g2}| > K_g \cdot \sqrt{\text{Variance}(X_{g1} - X_{g2})}$$

and for inferring an integrity defect if the said integrity test is satisfied, $K_g$ being a detection threshold predetermined so as to obtain a given probability $P_{nd}$ of detecting an error impacting one or the other, or both measurements $X_{g1}, X_{g2}$ simultaneously and a given false alarm probability $P_{fa}$.

According to a particular aspect of the invention, the detection threshold $K_g$ is determined on the basis of the following two inequalities:

$$\int_{K_g}^{\infty} \frac{1}{\sqrt{2\pi}} e^{-\frac{x^2}{2}} \cdot dx \leq P_{fa} \text{ and}$$

$$P_{nd} \leq$$

$$\int_{-\infty}^{K_g - \frac{VAL}{\sqrt{\max(\text{Variance}(X_{g1}),\text{Variance}(X_{g2})) - \text{Covariance}(X_{g1},X_{g2})}}} \frac{1}{\sqrt{2\pi}} e^{-\frac{u^2}{2}} \cdot du,$$

with VAL the tolerable limit value of error in one of the measurements $X_{g1}, X_{g2}$ and below which the integrity of the said measurements is guaranteed.

According to another particular aspect of the invention, the common sources of error between the first master GNSS module and the second slave GNSS module are eliminated from the computation of the variance of the difference between the outputs $X_{g1}, X_{g2}$ of the said first and second means for computing guidance data.

In a particular embodiment of the invention, the guidance data are at least equal to one of the following data: the horizontal position, the lateral deviation, the lateral rectilinear deviation, the vertical deviation, the vertical rectilinear deviation or the distance to the runway threshold.

In a variant embodiment of the invention, the comparison means executes beforehand a step of compensating, on the horizontal position guidance datum, for the asynchronism between the first master GNSS module and the second slave GNSS module.

The asynchronism is, for example, compensated for by computing the difference $\Delta POS$ of the horizontal positions $P_a, P_b$ that are provided by the first and second means for computing guidance data as follows:

$$\Delta POS = P_b - P_a - V_a \cdot (T_b - T_a)$$

with $V_a$ a speed measurement provided by the first means for computing guidance data, $T_a$ a time measurement provided by the first means for computing guidance data and $T_b$ a time measurement provided by the second means for computing guidance data.

The asynchronism can also be compensated for by synchronizing, the guidance data computed on a characteristic component of the radio-navigation signal received.

According to another particular aspect of the invention, the first and second GNSS modules exhibit a dissimilarity of hardware and/or software.

According to another particular aspect of the invention, the first and second GNSS modules are similar hardware-wise but implement the following dissimilar digital processing actions: different digital filterings, different correlators, allocation of different frequency plans.

In a variant embodiment, the device according to the invention comprises a distinct antenna and preamplifier for supplying each GNSS module so as to limit the common sources of integrity defect.

In another variant embodiment of the invention, the integrity test is modified as follows:

$$|X_{g1}-X_{g2}|>K_g\cdot\sqrt{\text{Variance}(X_{g1}-X_{g2})}+b$$

with b a measurement bias computed on the basis of the a priori knowledge of the distance between the two antennas.

In another variant embodiment, the device according to the invention comprises an antenna, a means for dividing the power of the signal received by the antenna and two distinct preamplifiers for supplying each GNSS module so as to limit the common sources of integrity defect.

The subject of the invention is also a multimode receiver for aiding the navigation of an aircraft comprising an ILS instrument landing system and a device for receiving radio-navigation signals according to the invention for the implementation of a GLS landing aid function in the approach phase.

The subject of the invention is further a hybrid system for aiding navigation comprising a multimode receiver comprising an ILS instrument landing system and an inertial system with GNSS-IRS hybridization comprising an IRS inertial system producing inertial data and a means of hybridization of GNSS navigation data by the said inertial data, characterized in that it furthermore comprises a device for receiving radio-navigation signals according to the invention whose first master GNSS module is integrated into the said inertial system so as to provide the said GNSS navigation data and whose second slave GNSS module is integrated into the said multimode receiver.

BRIEF DESCRIPTION OF THE DRAWINGS

Other characteristics and advantages of the present invention will be more apparent on reading the description which follows in relation to the appended drawings which represent.

MORE DETAILED DESCRIPTION

Figure 1:
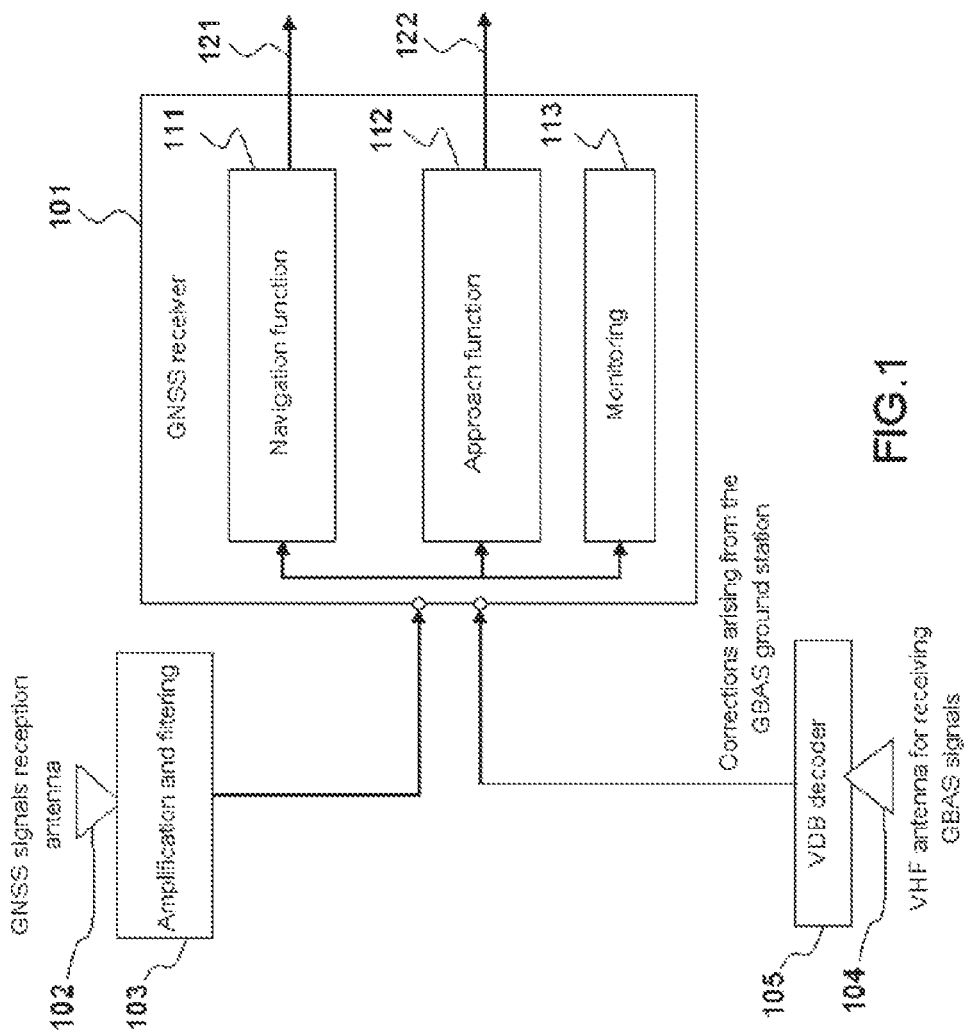
FIG. 1, the architecture of a single-channel GLS system according to the prior art, FIG. 2, the architecture of a dual-channel GLS system according to the prior art for category I approach operations, FIG. 3, the architecture of an MMR assembly according to the prior art, FIG. 4, the architecture of a GLS system according to the invention in a first embodiment relating to its implementation in an MMR assembly, FIG. 5, the architecture of a GLS system according to the invention in a second embodiment relating to its implementation in a GIRS assembly, FIG. 6, the architecture of a GLS system according to the invention in a third embodiment relating to its implementation in an autonomous GNSS receiver, FIG. 7, a diagram illustrating the computation of the variance of the error in the horizontal position for the implementation of the function for comparing the guidance data delivered by each GNSS channel of the system according to the invention, FIGS. 8a,8b,8c, three examples of single- or dual-antenna architectures for single- or dual-channel GLS system, FIG. 9, an illustration of the parameters necessary for the establishment of an approach phase.
Figure 2:
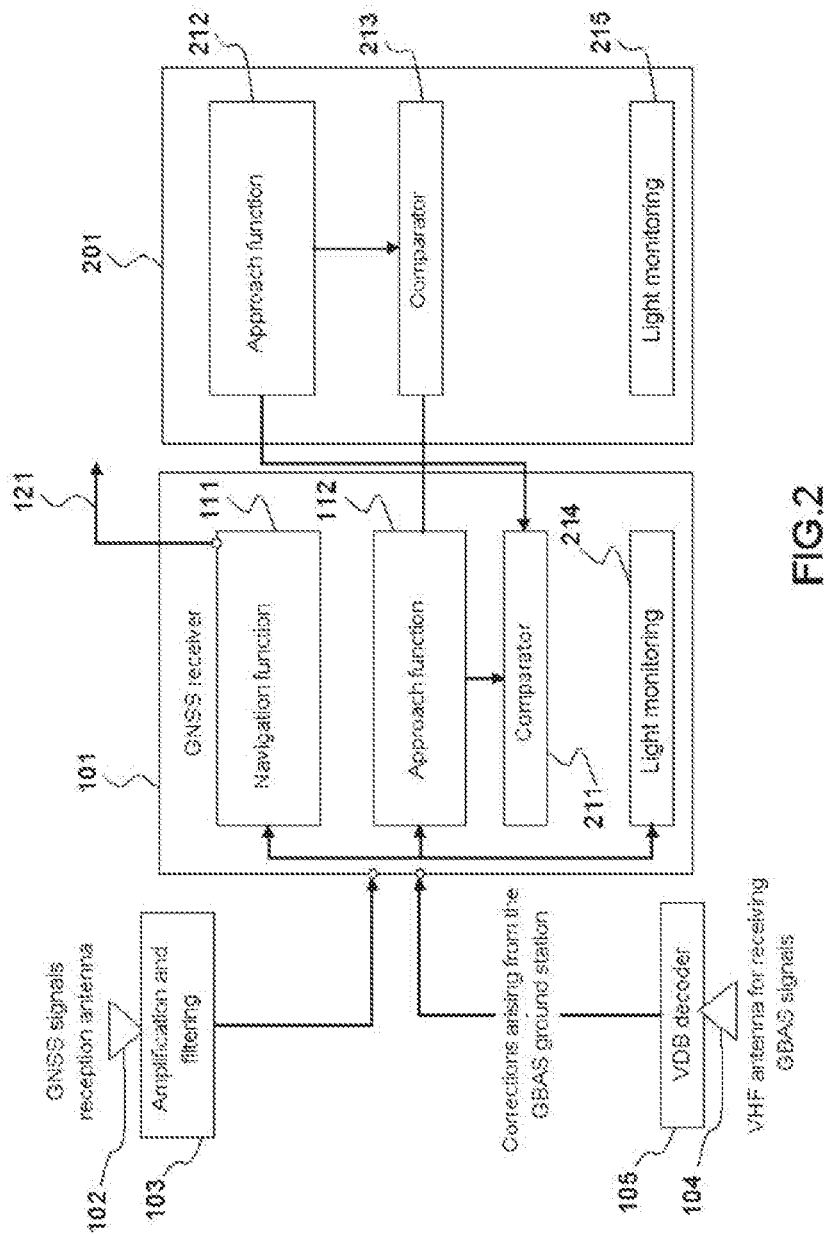
Figure 3:
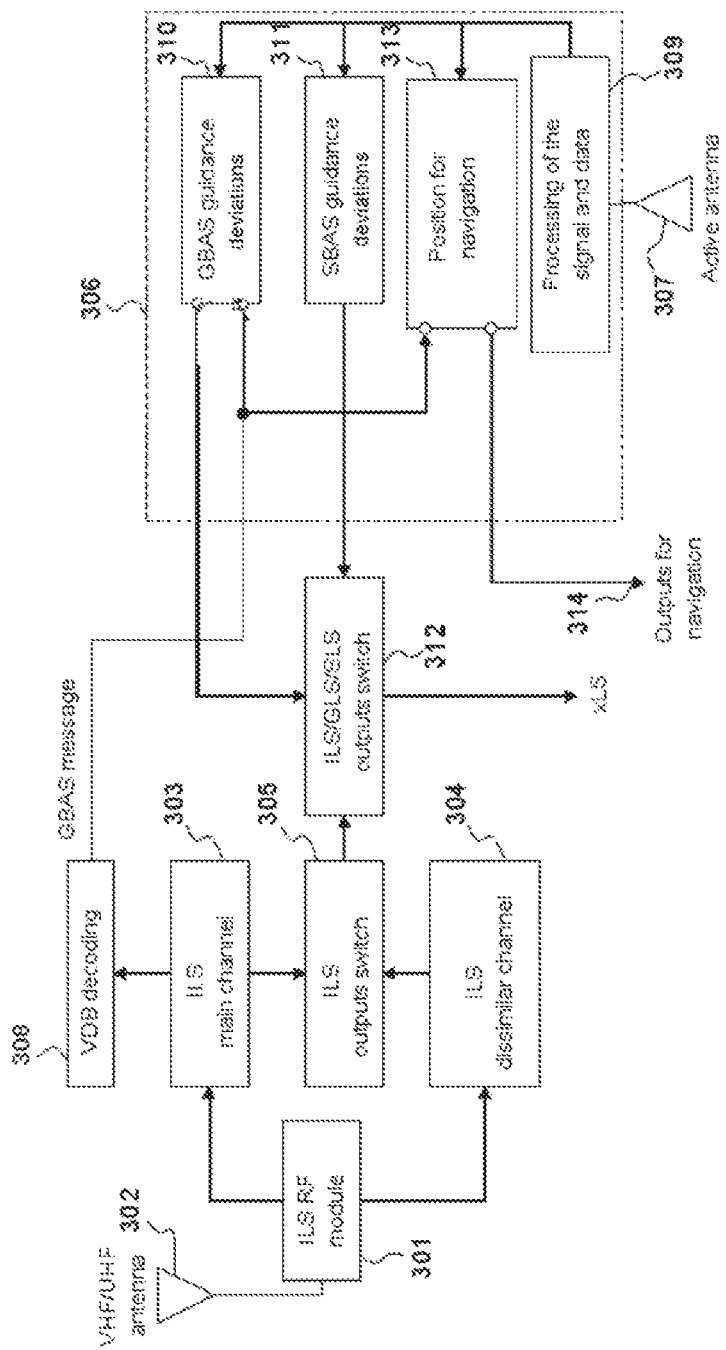

Known Architecture of an MMR Multimode Receiver Implementing a GLS Approach Aid Function FIG. 3 shows diagrammatically the known architecture of an MMR multimode receiver for the implementation of functions for aiding navigation and landing, notably in the approach phase.

The provision of guidance deviation allowing automatic control of the aeroplane for category III approach and landing phases is currently possible only by processing aboard the aeroplane radioelectric signals emitted by ground beacons within the framework of landing mechanisms of ILS (Instrument Landing System) or MLS (Microwave Landing System) type. These signals are processed by VHF (Very High Frequency) and UHF (Ultra High Frequency) signals receivers composed of an analogue reception module 301 which makes it possible to convert and digitize the radioelectric signals received by a VHF or UHF antenna 302, and of a computation module 303,304 which allows the transformation of the digitized signals into guidance deviation measurements transmitted to the user systems by means of a digital communication bus. These processing modules are commonly integrated into a so-called MMR (Multi Mode Receiver) assembly.

To guarantee the integrity of the output signal, and having regard to the limited reliability of the digital computation elements, the module for computing the guidance deviations consists in general of two different computers 303,304 whose elements are compared continuously, by a comparator 305, so as to detect operating anomalies. To avoid the risk of common mode shared by the two computers 303,304, hardware and software dissimilarities are brought into the design of these two computers.

An MMR assembly is moreover also intended to support the GLS landing aid function. Accordingly it integrates in addition to the modules necessary for the provision of the guidance information in ILS or MLS mode, a GNSS module 306 which receives the signals emitted by the radio-navigation satellites by way of a satellite antenna 307, as well as a VDB module 308 which allows the reception of the messages emitted by a GBAS ground station.

Autonomous location arising from the reception of the satellite signals is not of sufficient performance to guide the aeroplane during the approach and landing phase. The role of the GBAS ground station is mainly to broadcast correction messages necessary for augmenting the performance of an autonomous GNSS receiver, as well as to broadcast the approach trajectories usable on an airport at a given moment.

In the current systems, the GLS function is usable only to support so-called category I approach operations which are of a lesser criticality than the category III operations, and for which the safety requirements are less constraining. The GLS function is therefore supported by a single-channel GNSS computer, comprising a radio frequency analogue module (not represented) making it possible to amplify and to digitize the radioelectric signals emitted by the satellites, and a computation module 309 making it possible to extract from the digitized signals the data emitted by the satellites and the measurements of distance to these satellites so as to provide measurements of guidance deviations 310. Alternatively, a satellite-based SBAS augmentation system can also be utilized to provide alternative measurements of guidance deviations 311. The choice is left to the user, by way of an outputs switch 312 which makes it possible to toggle to the guidance deviation measurements respectively provided by the ILS system, the GLS system augmented via a GBAS system or the GLS system augmented via an SBAS system. Finally, the GNSS receiver 306 also comprises a position computation module for navigation 313 which also benefits from the corrections afforded by the GBAS or SBAS systems. The measurements provided by the navigation do not, however, relate to the approach phase and are introduced by way of indication. The messages arising from a GBAS augmentation system and transmitted by a ground station contain notably the following information, in the specific case of a GPS radio-navigation system:

corrections emitted by a monofrequency L1 GPS ground station which make it possible, when they are applied to the GPS signals of frequency L1 received aboard the aeroplane, to guarantee the precision and the integrity required for category I to III approaches, the data defining the path that must be followed by the aeroplane in the approach and landing phase. This path is used by the GPS receiver to determine the lateral and vertical deviation between the aeroplane's computed position and the path to be followed.

These GBAS messages are emitted at VHF frequency, received by the VHF antenna 302 of the MMR system, demodulated by the analogue module 301 and decoded by the VDB decoder 308.

The receiver emits lateral and vertical guidance deviations "GLS GAST-C" (for category I approaches) or "GLS GAST-D" (for category I to III approaches).

The MMR receiver chooses, by way of the switch 312, between the various sources of guidance deviations on command of the pilot of the aeroplane between deviations computed on the basis of the ILS (or MLS) beam, deviation computed on the basis of GPS satellite data corrected by SBAS (SLS) satellite data and deviations computed on the basis of GPS satellite data corrected by data of the GBAS (GLS) airport ground station.

The GNSS receiver 306 emits outputs in respect of navigation 314 consisting of a horizontal position to locate the aeroplane and of a speed used by the aeroplane's ADS-B ("Automatic Dependent Surveillance Broadcast") functions. These outputs in respect of navigation 314 are currently computed on the basis of the monofrequency L1 GPS signals received corrected either by the data of the GBAS ground station, or by the SBAS satellite data as a function of their availability.

New constellations, for example those of the GALILEO European system, and new satellite emission frequencies (frequency L5 in addition to the frequency L1) enable to improve the availability, the precision, the continuity and the integrity of location and of the speed of the aeroplane.

As already explained hereinabove, the mono channel architecture according to FIG. 3 in relation to the GLS function does not enable to deliver the signals with high integrity capable of supporting category III type approaches, having regard to the risk of undetected error of the GNSS module 306.

Figure 4:
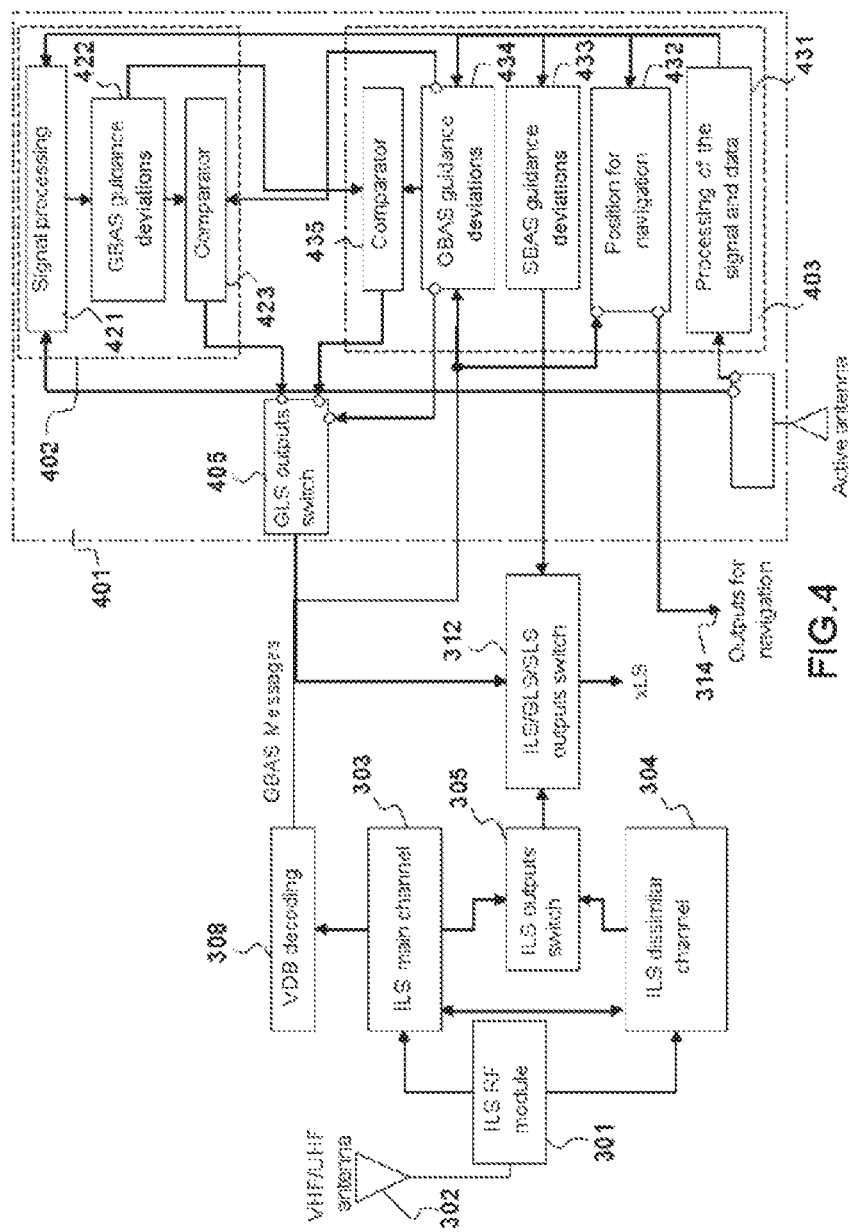

Architecture of an MMR Multimode Receiver Implementing a GLS Approach Aid Function with High Integrity Level According to the Invention FIG. 4 describes the architecture of an MMR receiver according to the invention implementing a GLS navigation aid function. The common elements shared by the architectures of FIGS. 3 and 4 are identified by the same references.

The GNSS receiver 306 of the architecture represented in FIG. 3 is replaced with a GNSS receiver 401, according to the invention, which is integrated into the customary structure of an existing MMR device so as to render it compatible with the category III approach and landing capabilities in GLS mode.

The GNSS receiver 401 comprises two, dissimilar, GNSS modules 402,403, operating according to a master-slave configuration.

The GNSS receiver 401 is designed on the basis of a support card which physically supports the two GNSS modules, 402,403 and which ensures the mechanical and electrical interface of the module with the host assembly. The expression electrical interface is understood to mean notably the power supplies of the module, the antenna connection, the digital data buses and the digital discrete inputs/outputs. This card integrates a switch 405 on the digital bus which routes the information computed for the needs of the GLS landing aid function. This switch 405 is activated by a "logical or" of discretes of commands produced by each of the two GNSS modules 402,403.

A first, master, GNSS module 403 is suitable for receiving and processing GNSS signals originating from several constellations of radio-navigation satellites, for example the constellations of the GPS system or those of the GALILEO system, and emitted on several different frequencies. It comprises at least, a module 431 for processing the radio-navigation signal and extracting the GNSS radio-navigation data or the GNSS radio-navigation data augmented by an SBAS system. On the basis of the measurements provided by this first signal processing module 431, a second module 432 utilizes these measurements to provide position information useful for aiding navigation, a third module 433 delivers guidance data on the basis of the GNSS measurements augmented by the corrections provided by an SBAS augmentation system and a fourth module 434 delivers guidance data on the basis of the GNSS measurements augmented by the corrections provided by a GBAS ground augmentation system.

The invention relates more precisely to the fourth module 434 whose outputs are utilized to implement the GLS approach procedure aid function.

A second GNSS module 402, operating in slave mode with respect to the first GNSS module 403, also comprises a module 421 for processing radio-navigation signals and extracting GNSS radio-navigation data and a module 422 which delivers guidance data on the basis of the GNSS measurements augmented by the corrections provided by a GBAS ground augmentation system.

Advantageously the second GNSS module 402 is a module compatible with a single type of GNSS constellations and with a single frequency.

The prime function of this slave module 402 is the control of the primary channel 403 of the GLS approach function.

Each GNSS module furthermore comprises a comparator 435,423 able to compare the guidance data provided by each module. A cross-comparison is thus carried out, each comparator 435,423 delivering an item of information to the switch 405 relating to the integrity of the measurement delivered by the module 434 for computing guidance data of the master GNSS module 403. A cross-comparison is carried out so as to guard against a fault impacting one of the two comparators 423,435. In the case where a single comparator is used, a fault in this comparator may give rise to the absence of signalling of an integrity defect on the output of the guidance data.

Advantageously, the master GNSS module 403 provides the slave GNSS module 402 with all of the data making it possible to operate it in slave mode.

The support card of the GNSS receiver 401 according to the invention also ensures communication between all of the functions implemented between the two GNSS modules 402, 403.

Processing Actions Necessary for the Operation of the Master GNSS Module 403

The master GNSS module 403 performs all the processing actions necessary for autonomous operation of a GNSS receiver. In particular, it executes the acquisition and the tracking of the multifrequency and multiconstellation signals, the decoding of the GNSS messages, the computation of the position for navigation, as well as the computation of the position and GBAS guidance deviations.

For the calculation of the GBAS guidance deviations, the master GNSS module 403 must implement all of the standard processing actions that are recalled here. In particular it must carry out the filtering, the amplification and the sampling of the radio-navigation signal received, the identification of the list of GNSS satellites visible to the receiver on the basis of the data at the disposal of the receiver (almanacs or ephemerides arising from the decoded messages transmitted by the GNSS satellites, known estimated position of the aeroplane, etc.). The master GNSS module 403 must furthermore search for and track the GNSS signals of the visible GNSS satellites with the aid of a local replica of the signal to be received, calculate the pseudo-distance measurements necessary for the computation of the position velocity time data, also called PVT data, on the basis of the carrier phase and of the code phase of the local replica slaved to the signal received, demodulate and extract the messages transmitted by the GNSS signals which contain the parameters necessary for the computation of the exact position of the satellite received (ephemerides and satellite clock parameters), verify the integrity of the VDB messages decoded with the aid of the data contained in the VDB message, correct and identify the valid pseudo-distances with the aid of the data contained in the VDB message, compute and validate the solution for PVT (Position, Velocity and Time) data on the basis of the corrected pseudo-distances, estimate the uncertainty in the computed PVT data, compute the lateral and vertical deviation between the computed PVT solution and the approach path described in the VDB message. Finally the comparator 435 must check the validity of the deviation measurements by comparing the data computed by the master receiver 403 with the data computed by the slave receiver 402.

Master-Slave Operation Between the Two GNSS Modules 403,402.

The master GNSS module 403 transmits certain information to the slave GNSS module 402 in such a way that it does not have to implement redundant processing actions already executed by the master module. In particular, the list of visible satellites is transmitted to the slave module together with the messages extracted from the GNSS signals received, such as the ephemerides and the satellite clock parameters.

On the basis of this information, the slave GNSS module 402 carries out the following processing actions: the filtering, the amplification and the sampling of the GNSS frequency band, the search for and the tracking of the GNSS signals of the visible satellites, as a function of the data transmitted by the master module 403 and with the aid of a local replica of the signal to be received. The slave module thereafter calculates the measurements of pseudo-distances necessary for the PVT computation in respect of the GLS function on the basis of the carrier phase and of the code phase of the local replica slaved to the signal received. It verifies the integrity of the messages arising from the master module 403 with the aid of the data contained in the VDB message, corrects and identifies the valid pseudo-distances with the aid of the data contained in the VDB message, computes and validates the PVT measurements on the basis of the corrected pseudo-distances, estimates the uncertainty impacting the computed PVT measurements, computes the lateral and vertical deviation between the computed PVT measurement and the approach path described in the VDB message and finally checks the validity of the lateral deviation by comparing 423 the data computed by this slave module 402 with the data computed by the master module 403.

In order to ensure optimal operation, the redundant processing actions between the two GNSS modules are removed. In particular, the processing actions carried out by the slave GNSS module 402 serve only to verify the integrity of the GLS guidance data provided with an alert time that is less than a predetermined time of the order of two seconds.

In particular, the filtering constraints (in terms of bandwidth, steepness of the off-band rejection and variation of group time within the band) and the constraints on the correlator used to track the local signals generated by the receiver to the GNSS signals transmitted by the satellites may be relaxed. Furthermore, the constraint on the period for refreshing the computations of PVT measurement and of deviation can also be relaxed and reduced to a period compatible with the alert time of two seconds.

Thus, the second GNSS module 402 performs only the processing actions necessary for calculating a second suite of guidance data for comparison with the first suite provided by the first module 403 with an aim of strengthening the integrity of these measurements.

Each of the two modules 402,403 performs the cross-comparison of the measurements provided so as to control the switch 405 for interrupting emission of the GLS deviations.

The proposed architecture remains valid both in the case where the receiver were to provide the GLS deviations directly and in the case where the receiver were to provide the differential positions corrected by the GBAS data. In the latter case, the computation of the deviations and the control of the computed deviations is carried out respectively in the computers 303,304 of the ILS system.

The GNSS receiver 401 according to the invention is advantageously adapted for integration into an MMR multimode device whose architecture is described in FIG. 4.

Figure 5:
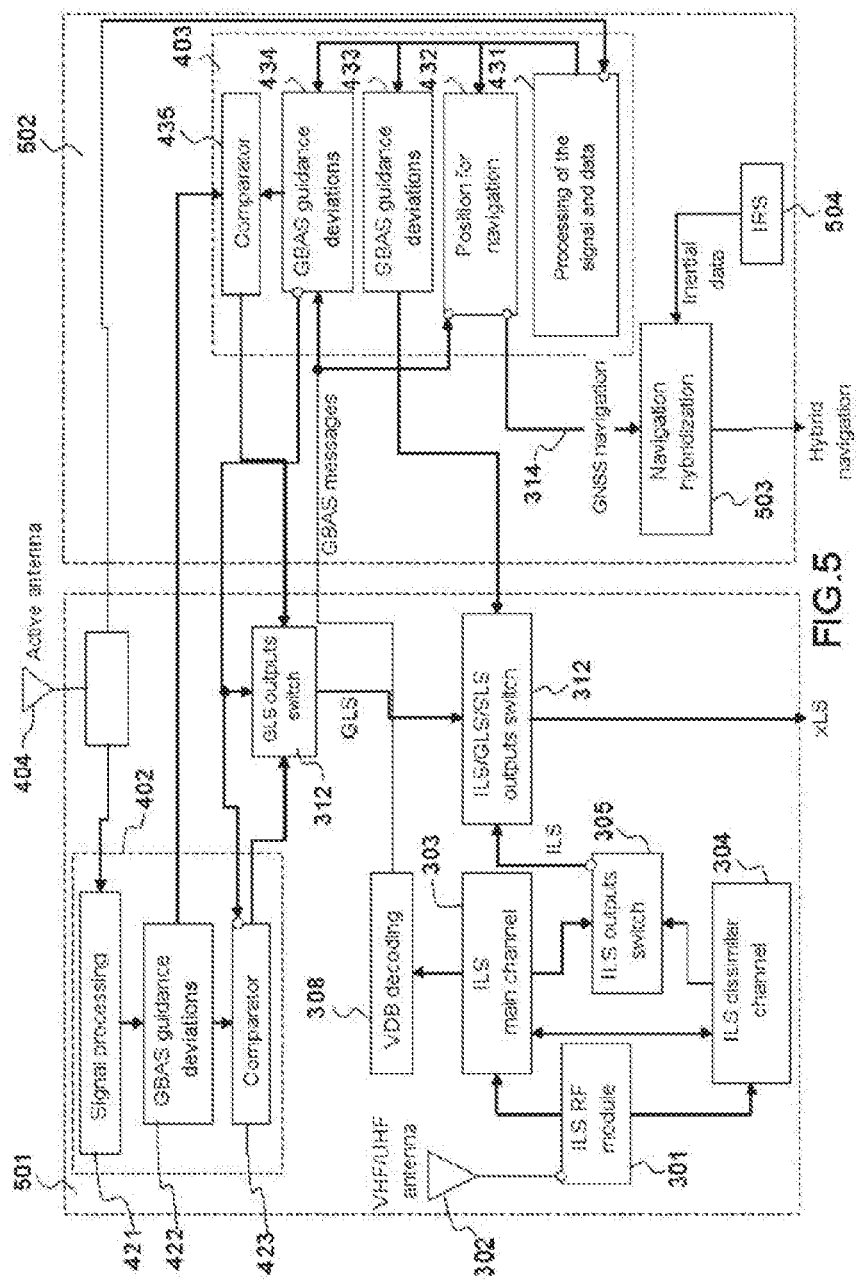
Figure 6:
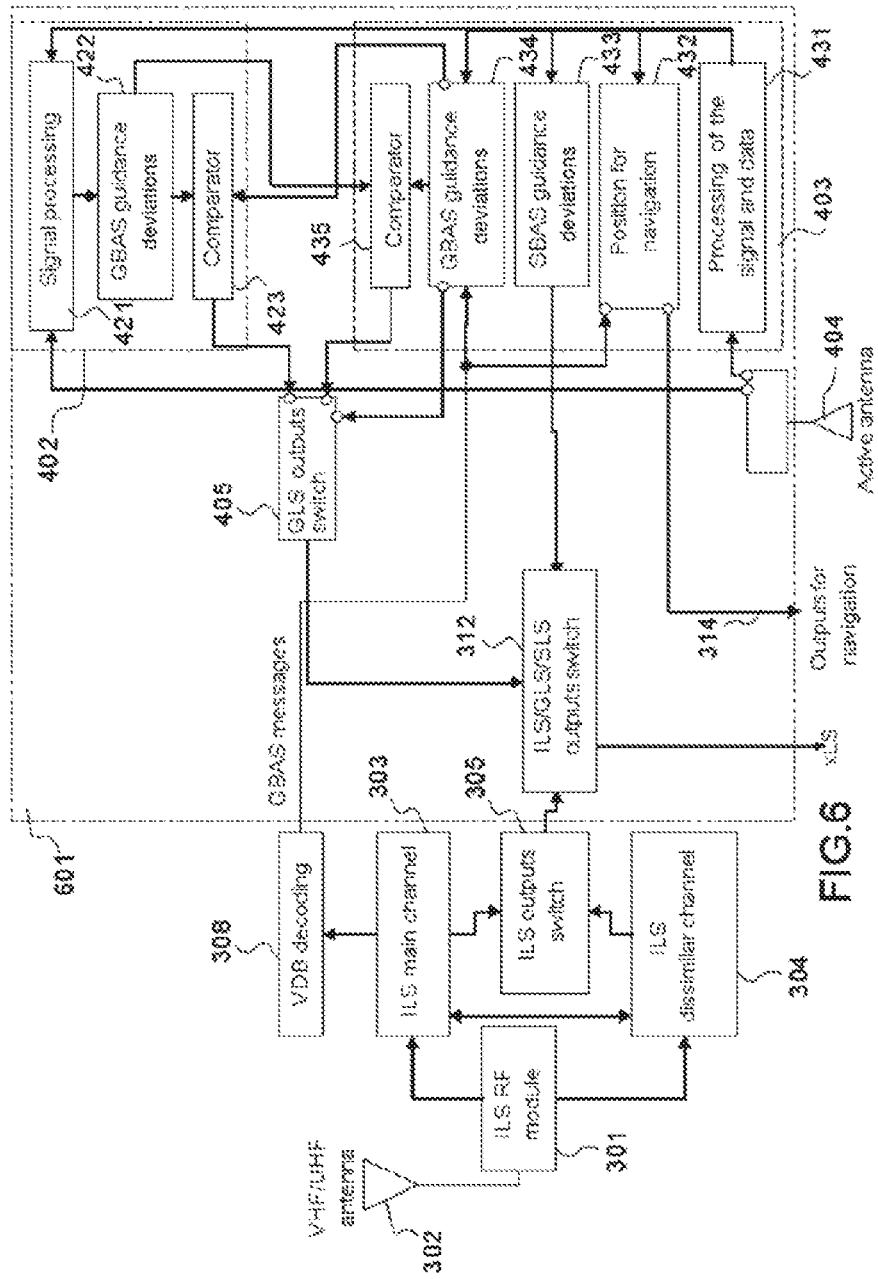

In other variant embodiments of the invention, described in FIGS. 5 and 6, it can also be integrated into a GNSS-inertial reference hybrid system of GIRS type or can operate in a stand-alone GNSS receiver.

FIG. 5 shows diagrammatically the architecture of a joint MMR and GIRS system. The common elements already described in FIGS. 3 and 4 are numbered with the same references.

The master GNSS receiver 403 implements two functions in parallel. On the one hand, a GNSS navigation function 433 whose outputs may be hybridized with inertial systems (IRS) to augment performance as regards availability, integrity and continuity of navigation and on the other hand a GNSS approach function 434 whose outputs are selected or not by a switch 312 as a function of the type of approach requested by the user, namely ILS, MLS or GLS.

For an application of MMR type such as described in support of FIG. 4, the integration of the GNSS dual-channel, according to the invention, into the MMR device enables to optimize the implementation of the GNSS approach function, the latter being placed close to the ILS/MLS approach functions and the computer 312 for selecting the outputs. However, it does not optimize the implementation of the navigation function on account of the absence of proximity with an external IRS inertial system.

The architecture described in FIG. 5 is adapted so as to enclose the navigation GNSS function 434 inside an IRS inertial system 504. The unit formed of the master GNSS module 403, of the IRS inertial system 504 and of a computer 503 for hybridizing the navigation data constitutes an assembly 502 called GIRS (GNSS-Inertial Reference System). The benefit of this architecture is to optimize the integrity, the continuity and the availability of the navigation solution by bringing the GNSS function and the inertial function closer together. The joint use of a GIRS assembly 502 and of an MMR assembly 501 makes it possible to ensure the dissimilarity of the GNSS processing actions that is necessary for the approach operations in category III. This enables to optimize the GNSS approach function by enclosing it inside the MMR assembly and the navigation function by enclosing it inside the inertial system 504. This architecture constitutes a variant implementation of the invention.

FIG. 6 shows diagrammatically another variant implementation of the invention for which the GNSS receiver 601 according to the invention is designed for stand-alone operation. In this case the assemblies relating to the ILS system are external to the GNSS receiver 601 itself. A difference with the implementation in an MMR assembly is that the switch 312 is internal to the GNSS receiver 601 whereas it is external in the case of an implementation in an MMR multi-mode system.

Implementation of the Function for Comparing the GLS Data of Each GNSS Module.

The implementation of the comparator 423,435 of the data produced by each GNSS module 402,403 is now described in greater detail. The objective of this comparison is both to limit the rate of undetected faults when the latter impact one or the other of the modules and also when the two modules are simultaneously impacted by an error whose source is common.

The data produced by each GNSS module whose integrity must be monitored are notably, but not exclusively, the following data: the GBAS differential horizontal position, the heading of the selected landing runway, the linearized lateral deviation, the linearized vertical deviation, the vertical distance to the LTP/FTP, the lateral deviation, the vertical deviation, the distance to the runway threshold and the approach parameters such as the angle of approach, the landing runway selected, or the active GBAS approach service.

Hereinafter, the expression guidance data will designate all of the data provided by each GNSS module, including notably the data listed hereinabove, and whose integrity must be monitored.

When the two GNSS processing channels use the same GNSS signals and therefore the same satellite measurements, the errors related to defects common to the two channels cancel out when the difference between the guidance data produced by the two channels is computed.

However, each of the two GNSS modules possesses its own clock or local time base and the computations carried out are done at independent instants. Thus, when the difference between the guidance data produced by each channel is computed, a residual error appears due to the asynchronism of the measurements carried out by each module.

For example, in the case where the guidance datum is a horizontal position, the difference ΔPOS between the two computed horizontal positions experiences a deviation related to this asynchronism and to the dynamics of the aeroplane, which may be quantified by the following relation:

$$\text{Error}(\Delta POS) = V \cdot \Delta T + \tfrac{1}{2} a \cdot \Delta T^2 + \tfrac{1}{6} j \cdot \Delta T^3 + \epsilon$$

V is the horizontal speed of the aeroplane, a is the horizontal acceleration of the aeroplane, j is the horizontal over-acceleration of the aeroplane, ϵ is the residual dynamics of highest degree, considered to be negligible, and ΔT is the temporal discrepancy introduced by the asynchronism of the computations between the two GNSS modules.

In practice, the shift ΔT is of the order of 100 ms and this may give rise to a discrepancy between the two measured positions of possibly as much as 41.2 m during navigation and 12.8 m during approach.

Two schemes enabling to compensate for the residual error Error(ΔPOS) are now presented.

A first scheme consists in using the computed horizontal speed so as to compensate for the time discrepancy between the two computed horizontal positions.

Accordingly, if the first GNSS module provides a suite of navigation data $P_a V_a T_a$ and the second GNSS module provides a suite of navigation data $P_b V_b T_b$, where $P_a$, $P_b$ designates a position measurement, $V_a$, $V_b$ a speed measurement and $T_a$, $T_b$ a time measurement, the difference ΔPOS must be computed as follows:

$$\Delta POS = P_b - P_a - V_a \cdot (T_b - T_a)$$

That is to say the difference between the two positions is compensated for by the term $V_a(T_b - T_a)$ which comprises the item of information necessary to compensate for the temporal shift between the measurements carried out by each channel.

A second scheme consists in ensuring that the PVT guidance data computed by each channel are synchronous with a characteristic component of the GNSS signal received. For example, for the case of a GPS signal, the pattern commonly designated by the acronym 1PPS, present within the signal, may be used to synchronize the guidance data, with a known maximum error, for example equal to 500 μs. In this way, the time discrepancy between the two channels is guaranteed to plus or minus 1 ms, thereby inducing a maximum discrepancy between the two positions, due to the dynamics of the aeroplane, of the order of 4 cm, negligible with respect to the expected variance in the difference of the positions ΔPOS.

An advantage of this second scheme is that it no longer involves the speed $V_a$ computed by the first GNSS module of which the integrity is not necessarily ensured.

The compensation of the error in the difference ΔPOS between two horizontal positions enables to correct the asynchronism between the two GNSS modules for all the guidance data considered since they all depend on the horizontal or vertical position of the aeroplane.

The implementation of the function for cross-comparison of the navigation data is now described in greater detail. It is assumed that one or the other of the schemes described hereinabove has been used beforehand to compensate for the asynchronism of the computations between the two GNSS modules.

Initially, the implementation of the comparison function applied to the particular guidance datum, namely the horizontal position, is described.

The comparison function consists in this case in comparing the norm of the difference of the two computed horizontal positions with a criterion equal to the product of a predetermined detection threshold $K_w$, and of the square root of the variance of this same difference. Relation (1) illustrates this criterion:

$$\|\Delta POS_{Horizontal}\| > K_{POS} \cdot \sqrt{\text{Variance}(\Delta POS_{Horizontal})} \quad (1)$$

Figure 7:
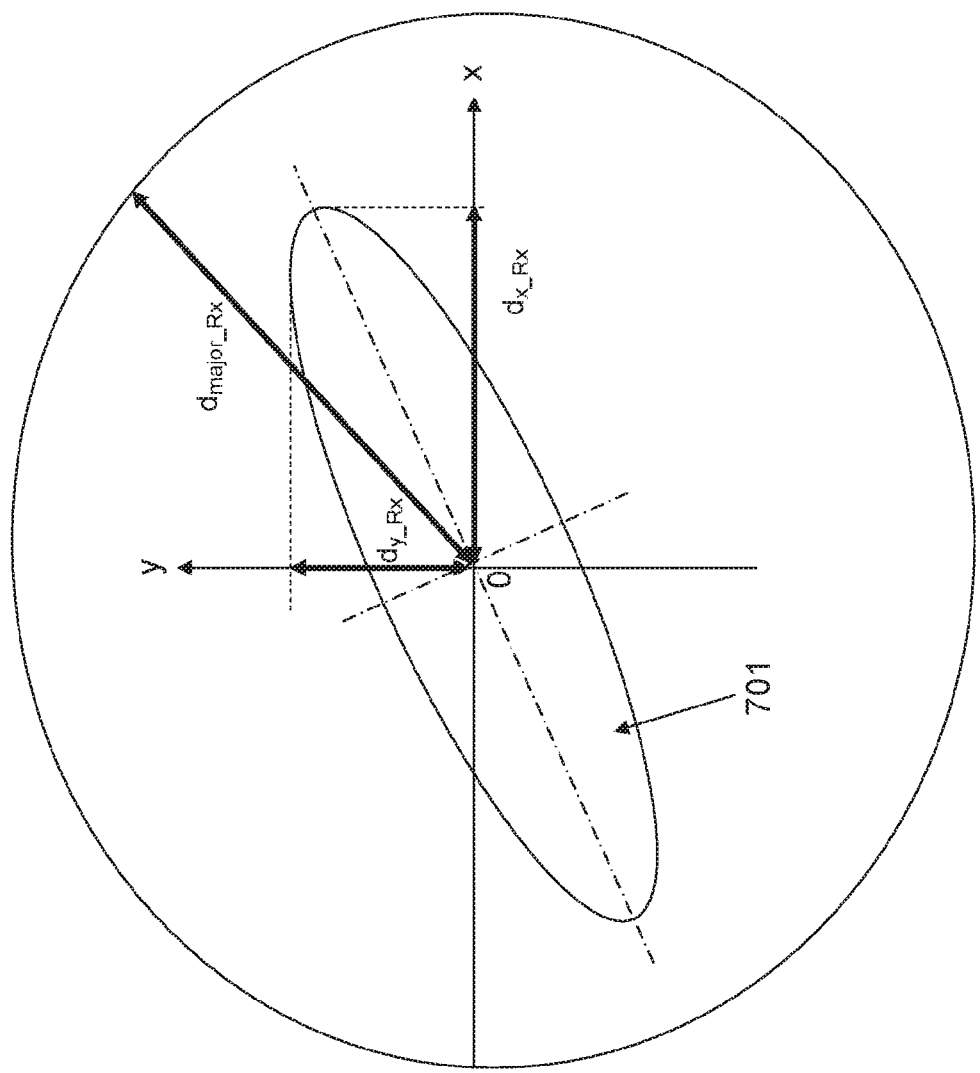

Advantageously, the variance of the difference of the horizontal positions may be computed with the aid of the following relations illustrated by FIG. 7.

$$\text{Variance}(\Delta POS_{Horizontal}) = d_{major\_R1}^2 + d_{major\_R2}^2$$

$$d_{major\_Rx} = \sqrt{\frac{d_{x\_Rx}^2 + d_{y\_Rx}^2}{2} + \sqrt{\left(\frac{d_{x\_Rx}^2 - d_{y\_Rx}^2}{2}\right)^2 + d_{xy\_Rx}^2}}$$

$$d_{x\_Rx}^2 = \sum_{i=1}^{N} s_{1,i}^2 \sigma_{Rx,i}^2;$$

$$d_{y\_Rx}^2 = \sum_{i=1}^{N} s_{2,i}^2 \sigma_{Rx,i}^2;$$

$$d_{xy\_Rx} = \sum_{i=1}^{N} s_{1,i} s_{2,i} \sigma_{Rx,i}^2$$

$d_{major\_Rx}$, for x=1 or 2, is an upper bound on the estimated standard deviation of the horizontal position of the master GNSS module (Rx=R1) or of the slave GNSS module (Rx=R2) computed by considering the worst case configuration of the error ellipse 701, such as represented in FIG. 8, expressed in meters.

$d_{x\_Rx}$, is an upper bound on the estimated standard deviation of the projection on the axis Ox of the reference frame (Oxyz) of the distribution of the positions computed by the master receiver (Rx=R1) or slave receiver (Rx=R2), in meters.

$d_{y\_Rx}$ is an upper bound on the estimated standard deviation of the projection on the axis Oy of the reference frame (Oxyz) of the distribution of the positions computed by the master receiver (Rx=R1) or slave receiver (Rx=R2), in meters.

$d_{xy\_Rx}$ is an upper bound on the estimated covariance between the projections of the axes Ox and Oy of the reference frame (Oxyz) of the distribution of the positions computed by the master receiver (Rx=R1) or slave receiver (Rx=R2), in meters squared.

The variables $s_{1,j}$ and $s_{2,j}$ are components of the weighted projection matrix used for the position computation.

The variable $\sigma_{Rx,i}$, expressed in meters, corresponds to an upper bound on the standard deviation of the residual error in the distance between the i-th visible satellite and the GNSS reception antenna used for the position computation, performed by each GNSS module, referenced by the index x, for x varying from 1 to 2. This residual error results only from sources of errors impacting the operation of the GNSS module itself and not from sources of errors impacting the GNSS signal transmitted by the satellite such as errors related to the propagation of the signal. Thus, the detection of a fault between the two channels is refined, without increasing the false alarm rate since the sources of errors impacting the GNSS signal are seen in an identical manner by the two channels and cancel out when computing the difference of the positions provided by each channel. The fact of not including these error sources when monitoring the difference of the positions does not increase the false alarm rate.

An estimate of the standard deviation $\sigma_{Rx,i}$ is provided by the respective signal processing modules 421,431 of each GNSS module.

The residual error measured by way of this variance is notably related to three sources such as is illustrated by the following relation:

$$\sigma_{Rx,i}^2 = \sigma_{divg,i}^2 + \sigma_{noise,i}^2 + \sigma_{multipath,i}^2$$

$\sigma_{divg,i}^2$ is the variance of the residual error related to the transient phase of the code/carrier smoothing at the moment of initialization or of reinitialization of the filtering. The asynchronism and the decorrelation of the noise of the two GNSS modules may involve an asynchronism of the initializations/reinitializations and consequently involve a discrepancy in this error between the two channels.

$\sigma_{noise,i}$ is the variance of the residual error related to the thermal noise and to the passband of the code/carrier smoothing. The decorrelation of the noise of the two GNSS modules involves the decorrelation of this error.

$\sigma_{multipath,i}$ is the variance of the residual error related to the multipaths seen by the correlation function at the input of the code phase tracking loop. The dissimilarity of the correlation function between the two channels involves a decorrelation of this error.

In particular the following sources of errors are not taken into account in the computation of the variance of the positions difference:

the residual error after applying the corrections provided by the GBAS augmentation data. This error is common to the two GNSS modules which use the same source for receiving augmentation data, the residual error related to the effects of propagation of the satellite signals in the troposphere. This error is common to the two GNSS modules on account of the use of one and the same antenna or of two close antennas, the residual error related to the effects of propagation of the satellite signals in the ionosphere. This error is common to the two GNSS modules on account of the use of one and the same antenna or of two close antennas.

Thus, all the error sources common to the two modules are eliminated from the variance computation so as to refine the comparison criterion given by relation (1) so that only the sources of errors that are decorrelated between the two modules are taken into account.

To summarize, the comparison function 423,435 implemented in each GNSS module executes the following steps:
computation of the difference of the horizontal positions,
computation of the variance of this difference on the basis of the error standard deviations $\sigma_{Rx,i}$ estimated by each GNSS signal processing module,
application of the error detection criterion defined by relation (1),
if the criterion is positive, the presence of an integrity defect is inferred and an alert is triggered, in the converse case, the validity of the computed navigation data is inferred.

In practice, the detection threshold $K_{pos}$ is predetermined so as to minimize the false alarm probability and to maximize the probability of detecting an error in one of the two channels. Accordingly, a possibility consists in making the assumption that the difference ΔPOS is a Gaussian variable and determining the threshold $K_{pos}$ on the basis of the known Gauss curve. This curve conventionally gives, for a Gaussian variable X, the value of the threshold K to be chosen so that the ratio between the norm of X and the square root of X is greater than a given percentage.

Stated otherwise, the determination of the detection threshold $K_{pos}$ is done so as to make a compromise between a loss of continuity performance of the comparison function for too low a threshold $K_{pos}$ that may possibly give rise to false alarms (detection of an error although there is no error) and a loss of integrity performance of the comparison function for too high a threshold that may possibly give rise to the absence of detection of an error.

Thus, the determination of the threshold $K_{pos}$ must arise from a safety analysis making it possible to meet both the continuity constraint (absence of loss of the function during the critical approach phase) and the integrity constraint for the output data.

To give an exemplary computation of this threshold, the assumption is made that the aeroplane's approach system admits only a probability of loss of continuity equal to $10^{-5}$ over an exposure time of 1 minute (duration of the approach/landing phase) and that the probability that an undetected error of horizontal position is greater than a given value VAL, for example equal to 10 m, must be less than $10^{-9}$ over this same exposure time.

To meet these requirements, a first step consists in undertaking an analysis of the hardware failures and of their consequences so as to determine the probability of occurrence of a fault that may possibly give rise to the malfunctioning of the approach function by considering all of the elements concerned (VHF antenna, VDB receiver, GPS antenna, one of the two GPS reception channels, power supply, etc.). Let us assume that this analysis concludes in a probability of fault of $5 \cdot 10^{-6}$/minute. Let us also assume that this analysis concludes that only 10% of the identified faults may involve an integrity error in the outputs of one of the two GNSS channels.

If it is considered that there is discontinuity either in the case of a fault, or in the case of a false alarm of the monitoring mechanism, a continuity requirement of $10^{-5}$/minute and a fault rate of $5 \cdot 10^{-6}$/minute implies that this false alarm rate must be less than $5 \cdot 10^{-6}$/minute $(=10^{-5}$/minute$-5 \cdot 10^{-6}$/minute).

If it is considered that there is an integrity defect if there is a fault and that this fault involve an integrity error in one of the two outputs and that this error is not detected by the monitoring mechanism, then, to attain a probability of undetected error of $10^{-9}$/minute necessitates a horizontal position error detection rate of greater than $2 \cdot 10^{-3}$/minute $(=10^{-9}$/minute/ $(5 \cdot 10^{-6}$/minute*10%)).

The filterings implemented in GNSS receivers induce a strong temporal correlation of the output data for the approach: thus, statistically, to determine the probability of false alarm or of undetected error over the total duration of exposure of a minute, a single independent draw is considered.

The threshold $K_{pos}$ is fixed so as to maintain the false alarm probability of $5 \cdot 10^{-6}$. For a normalized Gaussian distribution, this amounts to defining a threshold $K_{pos}$ greater than or equal to 4.6

$$\int_{K_{pos}}^{\infty} \frac{1}{\sqrt{2\pi}} e^{-\frac{x^2}{2}} \cdot dx \leq 5.10^{-6} \Leftrightarrow K_{pos} \geq 4.6$$

More generally, the detection threshold $K_{pos}$ must satisfy the constraint defined by the following inequality:

$$\int_{K_{pos}}^{\infty} \frac{1}{\sqrt{2\pi}} e^{-\frac{x^2}{2}} \cdot dx \leq P_{fa},$$

with $P_{fa}$ the desired false alarm probability.

In the case of an error $\beta$ in one of the two channels involving an integrity defect (thus $\beta \geq 10$ m), the distribution of the discrepancy in horizontal position is bounded above by a Gaussian centred at $\beta$ and of standard deviation $d_{major\_Rx}$.

The probability of non-detection is then given by the following formulae:

$$P_{nd} = \int_{-\infty}^{K_{pos}\sqrt{d_{major\_R1}^2 + d_{major\_R2}^2}} \frac{1}{d_{major\_Rx}\sqrt{2\pi}} e^{-\frac{(x-\beta)^2}{2 \cdot d_{major\_Rx}^2}} \cdot dx$$

$$= \int_{-\infty}^{\frac{K_{pos}\sqrt{d_{major\_R1}^2 + d_{major\_R2}^2} - \beta}{d_{major\_Rx}}} \frac{1}{\sqrt{2\pi}} e^{-\frac{u^2}{2}} \cdot du$$

$$\leq \int_{-\infty}^{K_{pos} - \frac{\beta}{d_{major\_Rx}^2}} \frac{1}{\sqrt{2\pi}} e^{-\frac{u^2}{2}} \cdot du$$

$$P_{nd} \leq \int_{-\infty}^{K_{pos} - \frac{\beta}{\max(d_{major\_Rx})}} \frac{1}{\sqrt{2\pi}} e^{-\frac{u^2}{2}} \cdot du$$

To maintain an error detection rate of greater than $2 \cdot 10^{-3}$, it is necessary to fix the threshold $K_{pos}$ with the aid of the following relation:

$$K_{pos} \leq -3.1 + \frac{10}{\max(d_{major\_Rx})}$$

From the point of view of the performance of the GNSS system, we have:

$$\max(d_{major\_Rx}) < HDOP_{max} \cdot \max(\sigma_{Rx,i})$$

$HDOP_{max}$ is defined in the GPS standards at 1.5 by considering the satellites with elevation greater than 5° and a nominal constellation of 24 GPS satellites and by considering 99% of the possible positions on Earth and over time.

Considering satellites above 5° of elevation, the GPS standards define:
$\max(\sigma_{div,i})=0.25$ m
$\max(\sigma_{noise,i})=0.15$ m
$\max(\sigma_{multipath,i})=0.45$ m
Thus, $\max(\sigma_{Rx,i})=0.54$ m and consequently $\max(d_{major\_Rx})$ <0.8 m Thus, to maintain the continuity and integrity requirements, it is necessary to take a threshold value $K_{pos}$ in the interval [4.6; 9.4]. A value will for example be taken in the middle of the interval at $K_{pos}=7$.

An equivalent scheme is carried out to verify the integrity of the other types of guidance data. In particular an error detection criterion equivalent to that given by relation (1) for the particular case of the horizontal position is proposed.

The calculation of this criterion for verifying the integrity of the measurements of lateral, lateral rectilinear, vertical, vertical rectilinear deviation as well as the distance to the runway threshold is now described.

Figure 9:
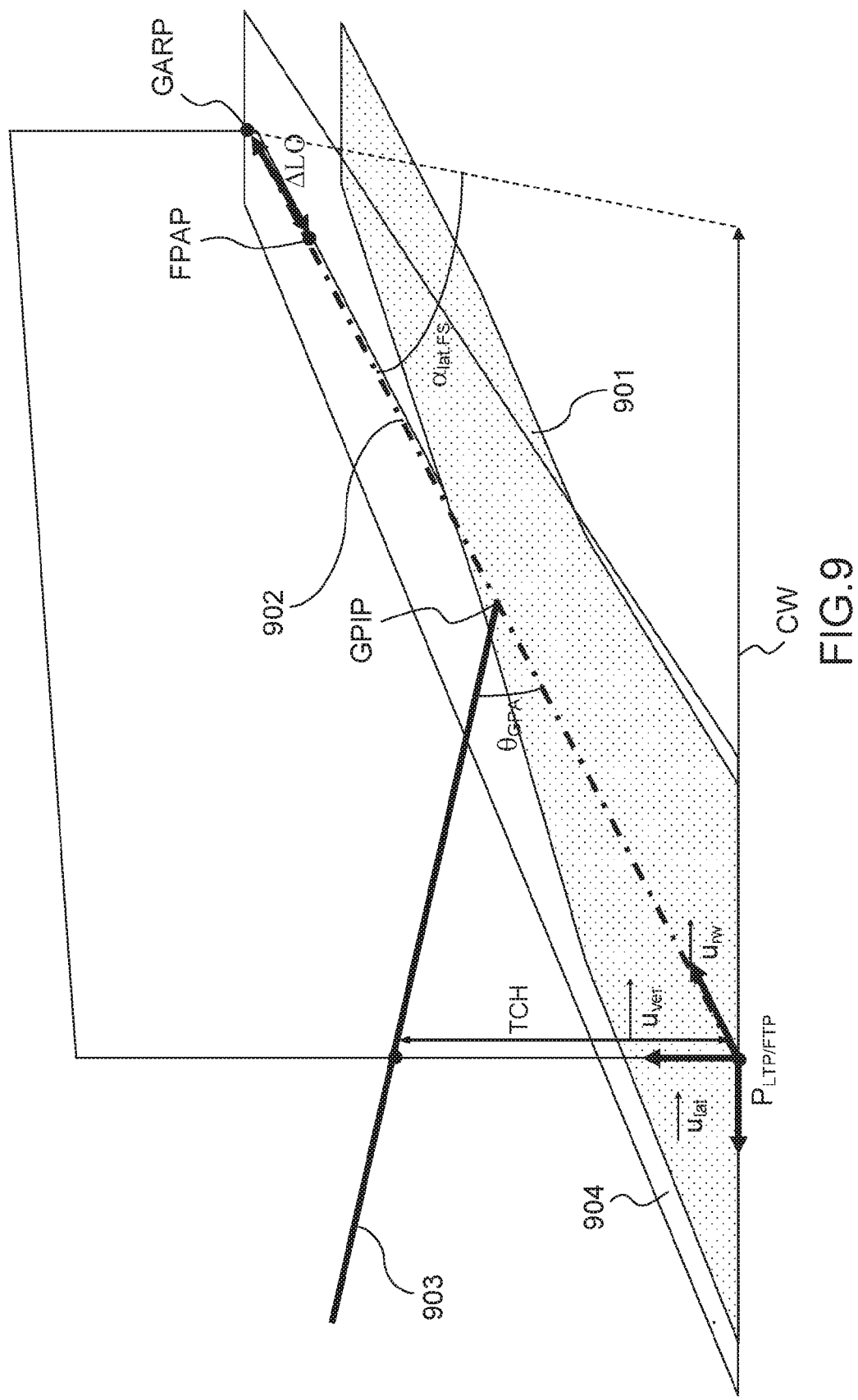

FIG. 9 shows diagrammatically the parameters which come into play during an approach procedure with a view to a landing on a runway 901 along a landing axis 902. These parameters are provided by a GBAS station via the VDB link. The aircraft follows an approach path 903 defined by the angle $\theta_{GPA}$ between the direction formed by this path 903 and the local plane of the landing runway 901 at the point $P_{LTP/FTP}$ which corresponds to the runway threshold in a reference frame fixed with respect to the Earth, for example the ECEF (Earth Centered Earth Fixed) reference frame. The final approach phase is furthermore defined with the aid of the following parameters: the point FPAP (Flight Path Alignment Point), the end of runway point GARP, the distance $\Delta$LO between the points FPAP and GARP, the height TCH of the approach path above the point $P_{LTP/FTP}$, the parameter CW (Course Width) used to normalize the lateral deviation to the value scale used in an ILS system and the point GPIP of intersection between the approach path 903 and the horizontal plane 904. The right-handed orthogonal reference frame $(P_{LTP/FTP}, \vec{u}_{rw}, \vec{u}_{lat}, \vec{u}_{vert})$ is defined on the basis of the point $P_{LTP/FTP}$. The unit vector $\vec{u}_{rw}$ is collinear with the landing axis 902. The point GPIP is defined in this reference frame by the coordinates $$\left(\frac{TCH}{\tan(\theta_{GPA})}, 0, 0\right).$$

The lateral deviation $\alpha_{lat,Rx}$ is computed on the basis of the approach parameters with the aid of the following relation:

$$\alpha_{lat,Rx} = \frac{0.155}{\alpha_{lat,FS}} \tan^{-1}(a_{lat,Rx})$$

$$= \frac{\vec{u}_{lat} \cdot \overrightarrow{P_{LTP/FTP}P_{Rx}}}{\|\Delta FPAP\| + \Delta OL - \vec{u}_{rw} \cdot \overrightarrow{P_{LTP/FTP}P_{Rx}}}$$

with $$\alpha_{lat,FS} = \pm\tan^{-1}\left(\frac{CW}{\|\Delta FPAP\| + \Delta LO}\right)$$

$P_{Rx}$ is the position measurement in the terrestrial reference frame, computed by each GNSS module.

The difference between the lateral deviations computed by each of the two GNSS modules is given by the following relation:

$$\alpha_{lat,R1} - \alpha_{lat,R2} \approx \frac{0.155}{\alpha_{lat,FS}}(a_{lat,R1} - a_{lat,R2})$$

$$\approx \frac{0.155(\vec{u}_{lat} \cdot \overrightarrow{P_{R2}P_{R1}})}{\alpha_{lat,FS} \cdot (\|\Delta FPAP\| + \Delta OL - \vec{u}_{rw} \cdot \overrightarrow{P_{LTP/FTP}P_{Rx}})}$$

The variance of this difference is given by the following relation:

$$\text{Variance}(\alpha_{lat,R1} - \alpha_{lat,R2}) \approx$$

$$\left(\frac{0.155}{\alpha_{lat,FS} \cdot (\|\Delta FPAP\| + \Delta OL - \vec{u}_{rw} \cdot \overrightarrow{P_{LTP/FTP}P_{Rx}})}\right)^2 \cdot$$

$$\text{Variance}(\vec{u}_{lat} \cdot \overrightarrow{P_{R2}P_{R1}})$$

With $$\text{Variance}(\vec{u}_{lat} \cdot \overrightarrow{P_{R2}P_{R1}}) = d^2_{lat,R1} + d^2_{lat,R2},$$

$d_{lat,Rx}^2$ is an upper bound on the estimated variance of the projection on the axis ulat of the distribution of the positions computed by the master module (Rx=R1) or slave module (Rx=R2), in meters squared.

$$d^2_{lat,Rx} = \sin^2\theta \cdot \sum_{i=1}^{N}(s^2_{1,i} \cdot \sigma^2_{Rx,i}) + \cos^2\theta \cdot \sum_{i=1}^{N}(s^2_{2,i} \cdot \sigma^2_{Rx,i})$$

and $\theta$ the angle of heading of the runway with respect to North, computed on the basis of the parameters transmitted by the G BAS system.

To test the integrity of the lateral deviation measurements carried out by each GNSS module, a detection threshold $K_{lat}$ is defined, according to criteria similar to those adopted for the case of the horizontal position, so as to minimize the false alarm probability and to maximize the probability of detecting an error in computing the lateral deviation on one of the two channels. A lateral deviation integrity defect alert is thus triggered if the following criterion is complied with:

$$|\alpha_{lat,R1} - \alpha_{lat,R2}| > K_{lat} \cdot \frac{0.155}{\alpha_{lat,FS} \cdot (\|\Delta FPAP\| + \Delta OL - \vec{u}_{rw} \cdot \overrightarrow{P_{LTP/FTP}P_{Rx}})} \sqrt{d^2_{lat,R1} + d^2_{lat,R2}}$$

which can be expressed more simply as:

$$|\alpha_{lat,R1} - \alpha_{lat,R2}| > K_{lat} \cdot \sqrt{\text{Variance}(\alpha_{lat,R1} - \alpha_{lat,R2})} \quad (2)$$

On the basis of the approach parameters it is also possible to compute the lateral rectilinear deviation as follows:

$$\alpha_{rectlat,Rx} = \vec{u}_{lat} \cdot \overrightarrow{P_{LTP/FTP}P_{Rx}}$$

In a similar manner, to test the integrity of the lateral rectilinear deviation measurements, a detection threshold $K_{rectlat}$ is defined so as to minimize the false alarm probability and to maximize the probability of detecting an error on one of the two channels and a lateral rectilinear deviation integrity defect alert is triggered if the following criterion is complied with:

$$|\alpha_{rectlat,R1} - \alpha_{rectlat,R2}| > K_{rectlat} \cdot \sqrt{\text{Variance}(\alpha_{rectlat,R1} - \alpha_{rectlat,R2})} \quad (3)$$

Which can also be written in the form:

$$|\alpha_{rectlat,R1} - \alpha_{rectlat,R2}| > K_{rectlat} \cdot \sqrt{d^2_{lat,R1} + d^2_{lat,R2}}$$

The integrity test criteria for the guidance data which relate to the vertical deviation, the vertical rectilinear deviation and the distance to the runway threshold are established in an analogous manner with the aid of relations (4), (5) and (6).

$$|\alpha_{vert,R1} - \alpha_{vert,R2}| > K_{vert} \cdot \sqrt{\text{Variance}(\alpha_{vert,R1} - \alpha_{vert,R2})} \quad (4)$$

$$|\alpha_{rectvert,R1} - \alpha_{rectvert,R2}| > K_{rectvert} \cdot \sqrt{\text{Variance}(\alpha_{rectvert,R1} - \alpha_{rectvert,R2})} \quad (5)$$

$$|d_{thresh\_runw,R1} - d_{thresh\_runw,R2}| > K_{thresh\_runw} \cdot \sqrt{\text{Variance}(d_{thresh\_runw,R1} - d_{thresh\_runw,R2})} \quad (6)$$

Relation (4) may also be written in the form:

$$|\alpha_{vert,R1} - \alpha_{vert,R2}| > K_{vert} \cdot \frac{0.7}{\theta_{GPA} \cdot \|\vec{u}_{vert} \wedge (\overrightarrow{P_{GPIP}P_{Rx}} \wedge \vec{u}_{vert})\|} \sqrt{d^2_{vert,R1} + d^2_{vert,R2}}$$

with:

$$\alpha_{vert,Rx} = \frac{0.7}{\theta_{GPA}}(\tan^{-1}(a_{vert,Rx}) - \theta_{GPA})$$

$$\alpha_{vert,Rx} = \frac{\vec{u}_{vert} \cdot \overrightarrow{P_{GPIP}P_{Rx}}}{\|\vec{u}_{vert} \wedge (\overrightarrow{P_{GPIP}P_{Rx}} \wedge \vec{u}_{vert})\|}$$

-continued $\alpha_{vert,Rx} \ll 1$ and, $$\|\vec{u_{vert}} \wedge (\overrightarrow{P_{R1}P_{R2}} \wedge \vec{u_{vert}})\| \ll \|\vec{u_{vert}} \wedge (\overrightarrow{P_{GPIP}P_{Rx}} \wedge \vec{u_{vert}})\|$$

$$\alpha_{vert,R1} - \alpha_{vert,R2} \approx \frac{0.7}{\theta_{GPA}} (a_{vert,R1} - a_{vert,R2})$$

$$\approx \frac{0.7(\vec{u_{vert}} \cdot \overrightarrow{P_{R2}P_{R1}})}{\theta_{GPA} \cdot \|\vec{u_{vert}} \wedge (\overrightarrow{P_{GPIP}P_{Rx}} \wedge \vec{u_{vert}})\|}$$

$$d_{vert,Rx}^2 = \sum_{i=1}^{N} s_{3,i}^2 \sigma_{Rx,i}^2$$

Relation (5) may also be written in the form:

$$|\alpha_{rectvert,R1} - \alpha_{rectvert,R2}| > K_{rectvert} \cdot \sqrt{d_{vert,R1}^2 + d_{vert,R2}^2}$$

with $\alpha_{rectvert,Rx} = \vec{u_{vert}} \cdot \overrightarrow{P_{LTP/FTP}P_{Rx}}$ Relation (6) may also be written in the form:

$$|d_{Th\_hor,R1} - d_{Th\_hor,R1}| > K_{Th\_hor} \cdot \sqrt{d_{vert,R1}^2 + d_{vert,R2}^2}$$

with $d_{Th\_hor,Rx} = \|\vec{u_{vert}} \wedge (\overrightarrow{P_{LTP/FTP}P_{Rx}} \wedge \vec{u_{vert}})\|$ Concerning the heading 8 of the selected landing runway, a difference between the heading measurements computed by the two channels must give rise to a zero-tolerance integrity alert regarding the discrepancy between the two measurements since the two channels must use the same GBAS data.

Generally, an integrity test criterion for a guidance datum $X_g$, two measurements $X_{g1}, X_{g2}$ of which are provided respectively by the first master GNSS module and the second slave GNSS module, of the dual-channel device according to the invention, is established with the aid of the general relation (7):

$$|X_{g1} - X_{g2}| > K_g \cdot \sqrt{\text{Variance}(X_{g1} - X_{g2})} \quad (7)$$

$K_g$ is a detection threshold predetermined so as to minimize the false alarm probability $P_{fa}$, that is to say the probability that an integrity alarm is triggered although the measurements $X_{g1}, X_{g2}$ are valid, while maximizing the probability of detecting a real error impacting one or the other, or both measurements $X_{g1}, X_{g2}$ simultaneously. In a particular embodiment of the invention, such as developed hereinabove for the particular case of the horizontal position measurement, the detection threshold $K_g$ is determined on the basis of the following two relations:

$$\int_{K_g}^{\infty} \frac{1}{\sqrt{2\pi}} e^{-\frac{x^2}{2}} \cdot dx \leq P_{fa} \text{ and}$$

$$P_{nd} \leq \int_{-\infty}^{K_g - \frac{VAL}{\sqrt{\max(\text{Variance}(X_{g1}), \text{Variance}(X_{g2})) - \text{Covariance}(X_{g1}, X_{g2})}}} \frac{1}{\sqrt{2\pi}} e^{-\frac{u^2}{2}} \cdot du,$$

with $P_{nd}$ the probability of non-detection of an error and VAL the limit value of error in one of the measurements $X_{g1}, X_{g2}$, beyond which it is considered that an integrity defect exists for the output data $X_{g1}, X_{g2}$ of one of the two modules. Stated otherwise, the value VAL is the tolerable limit value of error in one of the measurements $X_{g1}, X_{g2}$, below which the integrity of the said measurements is assumed guaranteed.

The integrity test criterion (7) makes it possible notably to improve the detection probability performance for errors that are common to the two measurements $X_{g1}, X_{g2}$. The invention consists in triggering an integrity alert if relation (7) is satisfied.

The variance of the discrepancy between the two measurements $X_{g1}, X_{g2}$ may advantageously be determined on the basis of the parameters of the approach procedure and is minimized by eliminating the errors that are common to the two channels and by correcting the asynchronism of the two channels.

Schemes Making it Possible to Render Dissimilar the Master Slave Dual Architecture According to the Invention In order to improve the integrity level of a GLS system, an objective of the invention is to implement a cross-comparison of the guidance measurements provided by each GNSS module so as to eliminate the erroneous measurements when the error impacts only one or the other of the modules. However, even when such a cross-comparison is carried out, certain errors, which impact the two modules simultaneously in a common manner, are not detected. To alleviate this problem, a solution consists in introducing dissimilarity between the two GNSS processing channels so as to limit to the maximum the occurrence of errors related to sources common to both channels.

Several schemes making it possible to render the dual architecture according to the invention dissimilar are now described.

The following elements may be impacted by a defect which may give rise to an integrity defect in the guidance measurements provided as output from a GNSS receiver:

the filtering channel consisting of filters at the GNSS signal reception frequency as well as at the intermediate frequencies, the means of frequency syntheses of the GNSS receiver, in particular the reference oscillator, the components carrying out the synthesis of the local oscillators and of the sampling clock on the basis of the reference oscillator, the analogue mixer for transposing the GNSS frequency into intermediate frequencies before sampling, the power supply means for the analogue parts, with as feared effect, the generation of spurious spectral lines differently affecting the reception of the GNSS signals.

the power supply means for the preamplifier of the GNSS antenna with as feared effect the generation of spurious spectral lines upstream of the GNSS reception channel, the power supply means for the digital part of the receiver with as feared effect errors of execution of the processing actions necessary for the computation and the output of the deviations, the function for generating the local signals, for correlating and for tracking the signals received from the GNSS satellites with as feared effect undetected biases in the determination of the pseudo-distances and consequently potentially in the deviations computed, the software algorithms such as demanded by the norms relating to the GNSS standards such as the algorithms for validating the ephemerides and GNSS clock data; determination, filtering, correction and validation of the pseudo-distances between the satellites received and the receiver; computation, validation and estimation of the precision of the measurements of position, velocity and time PVT; computation and output of the deviations.

Among the defects cited hereinabove, a subset may give rise to a simultaneous defect on the two GNSS channels and thus may not be detected by the mutual monitoring of the channels. This entails notably the following defects:

hardware design defect leading to one and the same sensitivity to a specific mechanical or thermal environment:

this relates mainly to the analogue components and in particular the filters and the frequency synthesis components, hardware design defect triggered by a defect of the electrical power supply common to the two channels, software design defect related to a GNSS constellation configuration and to specific emitted GNSS signal characteristics, design defect revealed by a particular environment of interference and multipaths of the GNSS signal, for example related to reflections of the GNSS signal at the obstacles surrounding the antenna, software design defect related to a particular configuration of data emitted by the GBAS ground station (data regarding identification, authentication, corrections, description of the approach path, etc.), software design defect related to a particular case regarding the position of the aeroplane and the current time.

To process the sources of common fault, notably listed hereinabove, it is necessary to be certain of a dissimilarity of response of the two channels so as to render them detectable by the mechanism for mutual monitoring between the channels.

A first scheme consists in designing two channels in a different manner from the hardware and/or software point of view.

Concerning the hardware, the dissimilarity may be obtained through the use of different components, in particular as regards the components which are a source of integrity error. The components which must preferably be designed differently between the two channels are the components implementing the power supply for the analogue parts, the reference oscillators, the frequency synthesizers, the mixers, the analogue filters and the digital signal processors.

Concerning the software, the dissimilarity may be obtained through the use of independent development teams, of different programming languages or else of different compilation tools and a different compilation option, of different memory mapping schemes notably for the programming memory, the data memory or the nonvolatile data memory.

Another element of the dual-channel GNSS receiver according to the invention which may be a common source of integrity defect is the GNSS signals reception antenna and in particular the power supply for the preamplifier of the antenna.

FIGS. 8*a*, 8*b* and 8*c* show diagrammatically three possible architectures using one or two antennas to address the two GNSS modules of the receiver according to the invention.

FIG. 8*a* relates to a mono-antenna architecture 801 which uses a divider 803 to divide the power received through the preamplifier 802 of the antenna 801 so as to supply each GNSS module 804,805 of a dual-channel receiver according to the invention. Only one power supply source 806 is necessary for the antenna 801.

In the architecture of FIG. 8*a*, the preamplifier 802 of the antenna 801 is a common source of integrity defect for the two GNSS modules 804,805.

In order to introduce dissimilarity upstream of the radio-navigation signal processing channel, the architecture of FIG. 8*b* is proposed, in which two distinct antennas 811,812 are each linked to one of the GNSS modules 804,805 by way of two likewise distinct preamplifiers 821,822 which therefore do not introduce any common errors.

In the architecture of FIG. 8*b*, the two antennas being distinct, the cross-monitoring mechanism must take into account the difference between the outputs of the two antennas due to their different positions. Accordingly, two schemes may be implemented. A first scheme consists in adding to the monitoring criterion, given by relation (7), a maximum bias b computed on the basis of the a priori knowledge of the distance between the two antennas. The advantage of this scheme is that it uses only the item of information regarding the absolute distance between the two antennas. Relation (7) becomes:

$$|X_{g1}-X_{g2}|>K_g\cdot\sqrt{\mathrm{Variance}(X_{g1}-X_{g2})}+b \qquad (8)$$

b may advantageously be determined on the basis of the parameters of the approach procedure.

For the monitoring of the horizontal position, of the distance to the runway threshold, as well as vertical and horizontal rectilinear deviations, the bias b may be taken equal to the absolute distance between the two antennas, denoted subsequently $d_{ant}$.

For the monitoring of the lateral deviations, the bias b may be computed with the aid of the following relation:

$$b = \frac{0.155}{\alpha_{lat,FS}\cdot\left(\|\Delta FPAP\|+\Delta OL-\vec{u_{rw}}\cdot\vec{P_{LTP/FTP}P_{Rx}}\right)}d_{ant}$$

For the monitoring of the vertical deviations, the bias b may be computed with the aid of the following relation:

$$b = \frac{0.7}{\theta_{GPA}\cdot\left\|\vec{u_{vert}}\wedge\left(\vec{P_{GPIP}P_{Rx}}\wedge\vec{u_{vert}}\right)\right\|}d_{ant}$$

A second scheme applicable to the architecture of FIG. 8*b*, consists in translating the estimated position towards a common reference of the aircraft. The relative positions of the two antennas and of the common reference are known to the receivers in the reference frame of the aircraft and may be projected into the GNSS reference frame by using the aircraft attitude data provided to the receivers by an onboard inertial system. The two receivers can then make use of the vector joining their antenna to the common reference in order to correct the guidance data before comparing their difference with K times the estimate of their standard deviation. The advantage of this scheme, with respect to the first, is that it enables the monitoring criteria not to be relaxed and enables the probability of detecting an error in one of the two channels to be preserved.

An alternative to this dual-antenna architecture is represented in FIG. 8*c*. It consists in using a single antenna 831 at the output of which is positioned a divider 832 which separates the signal received and directs it respectively towards two preamplifiers 833,834. The advantage of this architecture is that it makes it possible to minimize the common sources of error between the two channels while avoiding the introduction of complementary difficulties into the monitoring mechanisms on account of the use of one and the same passive antenna and consequently of one and the same position reference computed by the two GNSS reception channels.

The use of different hardware and/or software means for each GNSS module constitutes a first scheme for introducing dissimilarity into the dual-channel receiver according to the invention.

A second scheme makes it possible to use the same hardware components between the two channels. It consists in configuring the manner of operation of each of the channels in a different way so as to ensure that the mechanism for monitoring between the channels detects a common defect in one of the hardware components identified as a potential source of integrity error.

The following configurations on each GNSS processing channel may be carried out to introduce dissimilarity. The digital reception filter of each GNSS module may be differently configured. For example, the passband of the filter of the master module may be configured for wideband reception while the passband of the filter of the slave module may be configured for narrowband reception.

In each GNSS module, the scheme for correlating the GNSS signal with the local replica may be different. For example, a narrow early-late or narrow double-delta correlator may be used for the master GNSS module whereas a wider early-late correlator is used for the slave GNSS module.

Finally, two different frequency plans may be used for the two GNSS reception modules by configuring the frequency syntheses of the local oscillators and the sampling frequency. By construction, the fact of using two different frequency plans makes it possible to guarantee that the spurious spectral lines generated by the analogue components for changing frequency and sampling are present at frequencies, phases and amplitudes which differ, for each module, at the level of the function for correlating the perturbed signal received with the local signal.

Given that the effect of a spurious spectral line depends on its phase and its frequency relative to the useful GNSS signal to be received, the disturbance of the tracking of this signal and of the estimated pseudo-distances differs between the two channels. Thus, a comparison between the two channels enables to detect such an inconsistency and to avoid outputting potentially erroneous deviations.

The invention enables to establish a criterion for monitoring the similarity of the output results of the two GNSS channels of the dual-channel receiver. The monitoring criterion is determined so as to minimize the false alarm rate, which gives rise to a problem of availability of the approach function, and to maximize the rate of detection of integrity errors which render the dual-channel mechanism ineffective. Hence, one of the objectives of the invention is to reduce as far as possible the comparison criterion without impacting the false alarm rate. The fact of eliminating the common sources of errors between the two channels in the determination of the detection threshold and the fact of correcting the asynchronism between the two channels makes it possible to reduce the detection threshold without increasing the false alarm rate.

The invention claimed is:

1. Device for receiving radio-navigation signals, for aiding the piloting of an aircraft, comprising a first master GNSS module and a second slave GNSS module which are dissimilar, the first master GNSS module comprising a first computer logic, including a processor, for processing radio-navigation signals and a second computer logic, including a processor, for computing guidance data ($X_g$) on the basis of the measurements provided by the said first computer logic—for processing the signals, the second slave GNSS module comprising a third computer logic, including a processor, for processing radio-navigation signals and a fourth computer logic, including a processor, for computing guidance data ($X_g$) on the basis of the measurements provided by the said third computer logic for processing signals, each GNSS module furthermore comprising a comparator for comparing between outputs $X_{g1}, X_{g2}$ of the said second computer logic and fourth computer logic for computing guidance data, configured for executing the following integrity test:

$$|X_{g1}-X_{g2}|>K_g \cdot \sqrt{\text{Variance}(X_{g1}-X_{g2})}$$

and for inferring an integrity defect if the said integrity test is satisfied, $K_g$ being a detection threshold predetermined so as to obtain a given probability $P_{nd}$ of detecting an error impacting one or the other, or both measurements $X_{g1}$, $X_{g2}$ simultaneously and a given false alarm probability $P_{fa}$.

2. Device for receiving radio-navigation signals according to claim 1, in which the detection threshold $K_g$ is determined on the basis of the following two inequalities:

$$\int_{K_g}^{\infty} \frac{1}{\sqrt{2\pi}} e^{-\frac{x^2}{2}} \cdot dx \le P_{fa} \text{ and}$$

$$P_{nd} \le$$

$$\int_{-\infty}^{K_g - \frac{VAL}{\sqrt{\max(\text{Variance}(X_{g1}), \text{Variance}(X_{g2})) - \text{Covariance}(X_{g1}, X_{g2})}}}$$

$$\frac{1}{\sqrt{2}} e^{-\frac{u^2}{2}} \cdot du,$$

with VAL the tolerable limit value of error in one of the measurements $X_{g1}, X_{g2}$ and below which the integrity of the said measurements is guaranteed.

3. Device for receiving radio-navigation signals according to claim 1, in which the common sources of error between the first master GNSS module and the second slave GNSS module are eliminated from the computation of the variance of the difference between the outputs $X_{g1}, X_{g2}$ of the said second computer logic and fourth computer logic for computing guidance data.

4. Device for receiving radio-navigation signals according to claim 1, in which the guidance data ($X_g$) are at least equal to one of the following data: the horizontal position, the lateral deviation, the lateral rectilinear deviation, the vertical deviation, the vertical rectilinear deviation or the distance to the runway threshold.

5. Device for receiving radio-navigation signals according to claim 1 in which the comparator executes beforehand a step of compensating, on the horizontal position guidance datum, for the asynchronism between the first master GNSS module and the second slave GNSS module.

6. Device for receiving radio-navigation signals according to claim 5, in which the asynchronism is compensated for by computing the difference $\Delta POS$ of the horizontal positions $P_a, P_b$ that are provided by the second computer logic and fourth computer logic for computing guidance data as follows:

$$\Delta POS = P_b - P_a - V_a \cdot (T_b - T_a)$$

with $V_a$ a speed measurement provided by the first means for computing guidance data, $T_a$ a time measurement provided by the first means for computing guidance data and $T_b$ a time measurement provided by the fourth computer logic for computing guidance data.

7. Device for receiving radio-navigation signals according to claim 5, in which the asynchronism is compensated for by synchronizing, the guidance data $(X_{g1}, X_{g2})$ computed on a characteristic component of the radio-navigation signal received.

8. Device for receiving radio-navigation signals according to claim 1, in which the first and second GNSS modules exhibit a dissimilarity of hardware.

9. Device for receiving radio-navigation signals according to claim 1, in which the first and second GNSS modules are similar hardware-wise but implement the following dissimilar digital processing actions: different digital filterings, different correlators, allocation of different frequency plans.

10. Device for receiving radio-navigation signals according to claim 8, in which the device comprises a distinct antenna and preamplifier for supplying each GNSS module so as to limit the common sources of integrity defect.

11. Device for receiving radio-navigation signals according to claim 10, in which the integrity test is modified as follows:

$$|X_{g1} - X_{g2}| > K_g \cdot \sqrt{\text{Variance}(X_{g1} - X_{g2})} + b$$

with b a measurement bias computed on the basis of the a priori knowledge of the distance between the two antennas.

12. Device for receiving radio-navigation signals according to claim 8, in which the device comprises an antenna, a divider for dividing the power of the signal received by the antenna and two distinct preamplifiers for supplying each GNSS module so as to limit the common sources of integrity defect.

13. Multimode receiver for aiding the navigation of an aircraft comprising an ILS instrument landing system and a device for receiving radio-navigation signals according to claim 1 for the implementation of a GLS landing aid function in the approach phase.

14. Hybrid system for aiding navigation comprising a multimode receiver comprising an ILS instrument landing system and an inertial system with GNSS-IRS hybridization comprising an IRS inertial system producing inertial data and a hybridizer of GNSS navigation data by the said inertial data, wherein it also comprises a device for receiving radio-navigation signals according to claim 1, whose first master GNSS module is integrated into the said inertial system so as to provide the said GNSS navigation data and whose second slave GNSS module is integrated into the said multimode receiver.

15. Device for receiving radio-navigation signals according to claim 1, in which the first and second GNSS modules exhibit a dissimilarity of software.

* * * * *